United States Patent
Yamazaki

(10) Patent No.: US 10,153,464 B2
(45) Date of Patent: Dec. 11, 2018

(54) BATTERY COVER

(71) Applicant: YAZAKI CORPORATION, Tokyo (JP)

(72) Inventor: Masayoshi Yamazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 88 days.

(21) Appl. No.: 15/147,939

(22) Filed: May 6, 2016

(65) Prior Publication Data

US 2016/0254502 A1 Sep. 1, 2016

Related U.S. Application Data

(63) Continuation of application No. PCT/JP2014/079714, filed on Nov. 10, 2014.

(30) Foreign Application Priority Data

Nov. 12, 2013 (JP) .................... 2013-233680

(51) Int. Cl.
H01M 2/04 (2006.01)
H01M 2/30 (2006.01)

(52) U.S. Cl.
CPC .......... H01M 2/043 (2013.01); H01M 2/30 (2013.01); H01M 2200/103 (2013.01); H01M 2220/20 (2013.01)

(58) Field of Classification Search
None
See application file for complete search history.

(56) References Cited

U.S. PATENT DOCUMENTS

| 2002/0134572 A1 | 9/2002 | Matsumura |
| 2002/0168566 A1 | 11/2002 | Ohtsuka et al. |
| 2012/0100418 A1 | 4/2012 | Ramakrishnan et al. |

FOREIGN PATENT DOCUMENTS

| CN | 202737025 U | 2/2013 |
| JP | H10-144365 A | 5/1998 |
| JP | 2001-256964 A | 9/2001 |

(Continued)

OTHER PUBLICATIONS

JP2002289171 English translation. Oct. 2002. Japan. Matsumura. (Year: 2002).*

(Continued)

Primary Examiner — Jonathan G Leong
Assistant Examiner — Christopher P Domone
(74) Attorney, Agent, or Firm — Metrolexis Law Group, PLLC

(57) ABSTRACT

A battery cover (1) covers an outer periphery of a fuse unit (13) connected to, through a battery terminal (11), a battery post (9) projecting in a recess (7) formed on an upper surface (5) of a battery (3). The battery cover (1) has a fuse cover part (15) covering the outer periphery of the fuse unit (13), and a terminal cover part (17). The terminal cover part (17) is connected to the fuse cover part (15) to be capable of being opened and closed, is arranged in the recess (7), and covers the battery post (9) and the battery terminal (11). The terminal cover part (17) is provided with a regulating portion (19) so as to regulate a movement of the terminal cover part (17) in a closing direction by coming in contact with the upper surface (5) of the battery (3).

7 Claims, 5 Drawing Sheets

(56) References Cited

FOREIGN PATENT DOCUMENTS

| | | | |
|---|---|---|---|
| JP | 2002-270082 A | | 9/2002 |
| JP | 2002-289171 A | | 10/2002 |
| JP | 2002289171 | * | 10/2002 |
| JP | 2002-329492 A | | 11/2002 |
| JP | 2010-83164 A | | 4/2010 |
| JP | 2010-108785 A | | 5/2010 |
| JP | 2013-016381 A | | 1/2013 |
| JP | 2013-069590 A | | 4/2013 |

OTHER PUBLICATIONS

Office action dated Sep. 5, 2017 in the counterpart Japanese patent application.
Office action dated Dec. 4, 2017 in a counterpart Chinese patent application.

* cited by examiner

BATTERY COVER

CROSS REFERENCE TO RELATED APPLICATIONS

This application is a Continuation of PCT Application No. PCT/JP2014/079714, filed on Nov. 10, 2014, and claims the priority of Japanese Patent Application No. 2013-233680, filed on Nov. 12, 2013, the content of both of which is incorporated herein by reference.

BACKGROUND

Technical Field

The present invention relates to a battery cover to be applied to a vehicle.

Related Art

Conventionally, as a battery cover, one which covers an outer periphery of a fuse unit connected, through a battery terminal, to a battery post arranged to project in a recess formed on the upper surface of a battery is known (refer to JP 2002-289171 A).

This battery cover has a first cover, as a fuse cover part covering the outer periphery of the fuse unit and a second cover, as a terminal cover part that is connected to the first cover to be capable of being opened and closed and that is arranged in the recess for covering the battery post and the battery terminal.

Since such a battery cover allows the battery terminal, the fuse, and others to be observed by opening the second cover in a state of the battery cover assembled to the battery, no removal or installation of the battery cover needs to be carried out every time, resulting in improvement of workability.

SUMMARY OF THE INVENTION

However, in the case of the battery cover described in JP 2002-289171 A, when the terminal cover part is closed, if the terminal cover part is excessively moved in the closing direction, the terminal cover part results in interference with the battery post or the battery terminal, and there was a possibility that damage occurred to the battery post or the battery terminal.

Accordingly, an object of the present invention is to provide a battery cover which can prevent damage to the battery post and the battery terminal when the terminal cover part is closed.

A battery cover according to the present invention covers an outer periphery of a fuse unit connected, through a battery terminal, to a battery post projecting in a recess formed on an upper surface of a battery. The battery cover has a fuse cover part covering the outer periphery of the fuse unit, and a terminal cover part connected to the fuse cover part to be capable of being opened and closed, arranged in the recess, and covering the battery post and the battery terminal. The terminal cover part is provided with a regulating portion configured to regulate a movement of the terminal cover part in a closing direction by coming in contact with the upper surface of the battery.

The battery cover according to the present invention may include the regulating portion provided on a lower surface of an extension portion exposed from the recess and extending over the upper surface of the battery, and may include a operating portion which is provided on an end of the extension portion for opening and closing the terminal cover part.

According to the present invention, since a regulating portion for regulating the movement of the terminal cover part in its closing direction by coming in contact with the upper surface of the battery is provided on the terminal cover part, when the terminal cover part is closed, the terminal cover part is not moved excessively in the closing direction, and the terminal cover part does not interfere with the battery post and the battery terminal.

According to the above configuration, it is possible to provide a battery cover which can prevent damage to the battery post and the battery terminal when the terminal cover part is closed.

DETAILED DESCRIPTION

Figure 1:
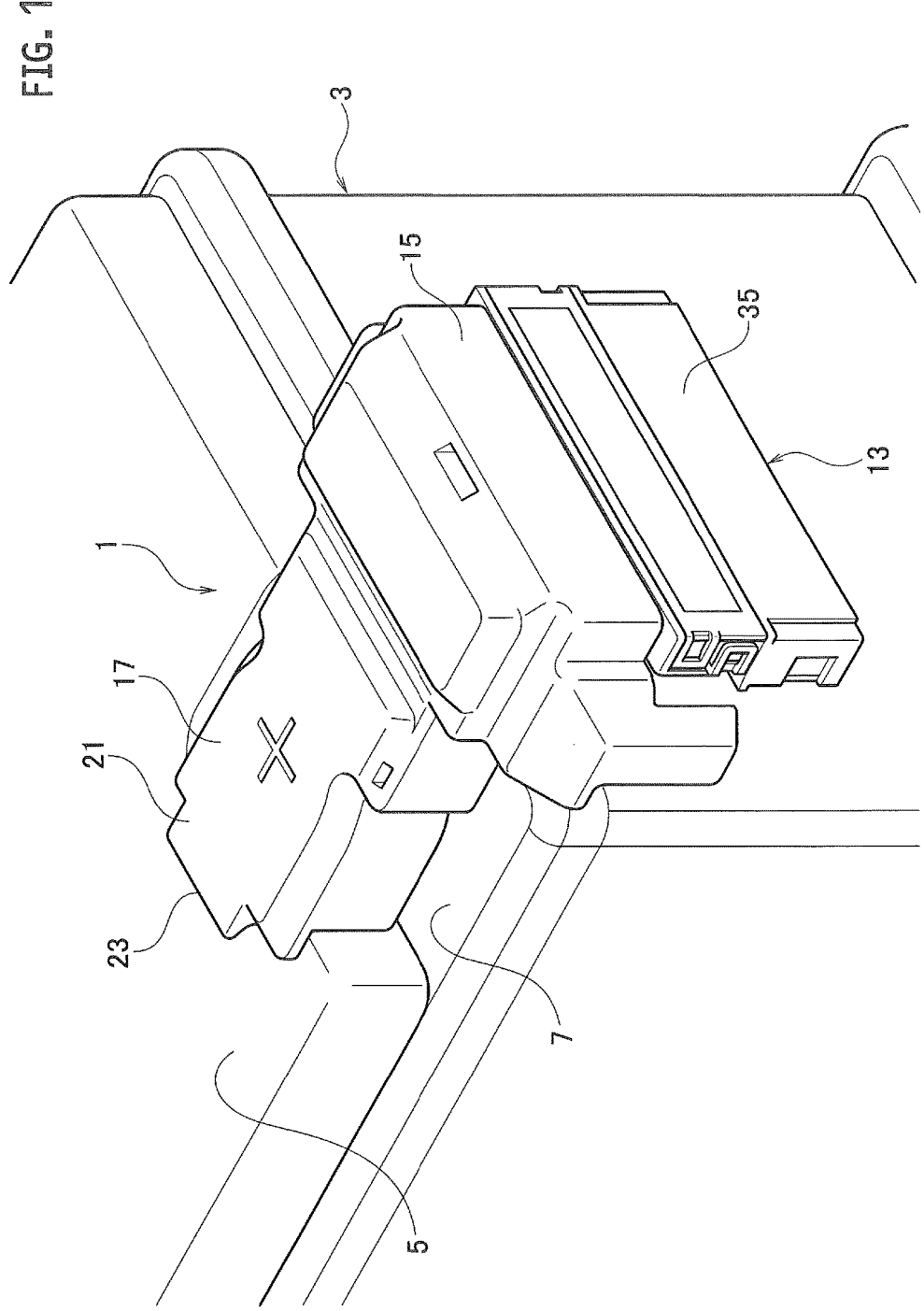
FIG. 1 is a perspective view that illustrates a battery cover according to an embodiment of the present invention, mounted on a battery.
Figure 2:
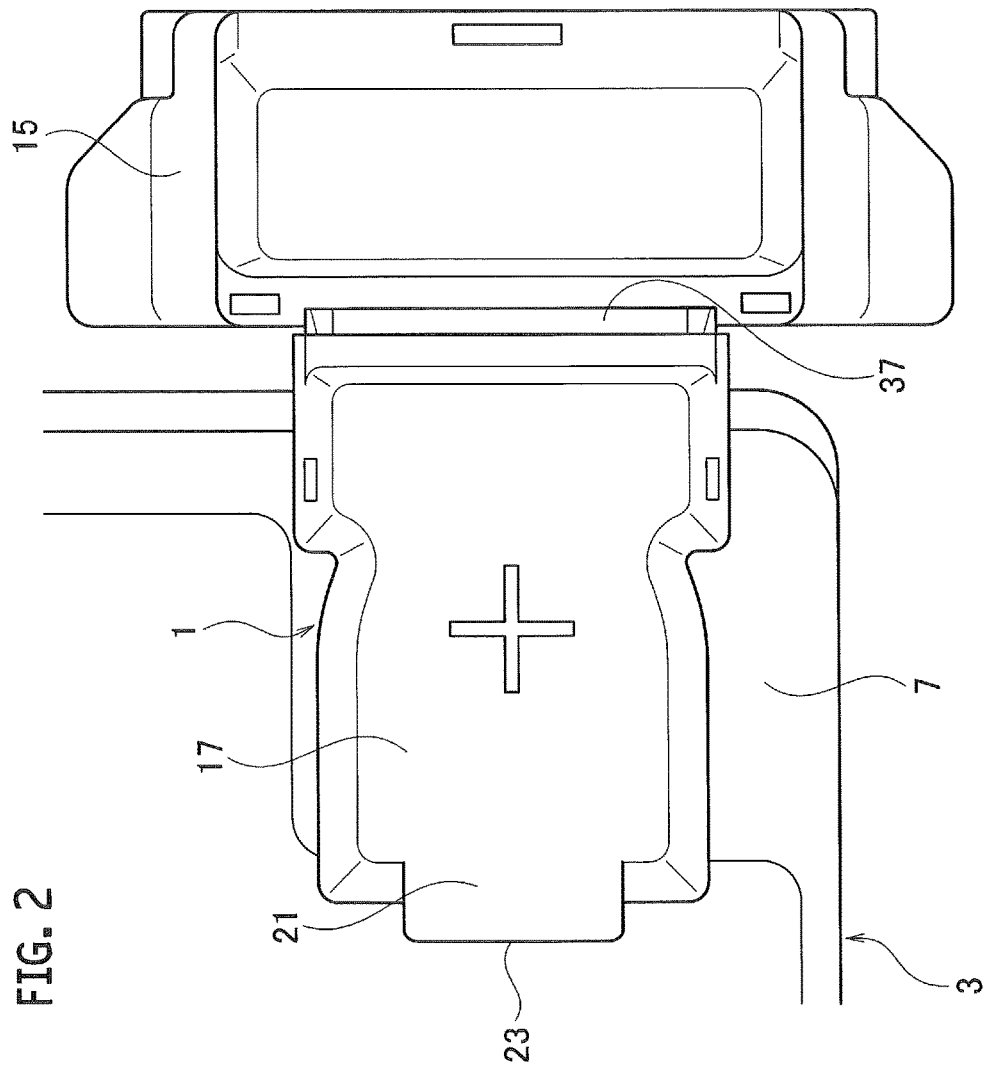
FIG. 2 is a top view that illustrates a battery cover according to an embodiment of the present invention, mounted on a battery.

A battery cover according to an embodiment of the present invention will be described with reference to FIGS. 1 to 5.

A battery cover 1 according to the present embodiment covers the outer periphery of a fuse unit 13 connected, through a battery terminal 11, to a battery post 9 arranged to project in a recess 7 formed on an upper surface 5 of a battery 3.

The battery cover 1 has a fuse cover part 15 for covering the outer periphery of the fuse unit 13, and a terminal cover part 17 which is connected to the fuse cover part 15 to be capable of being opened and closed and which is arranged in a recess 7 for covering the battery post 9 and the battery terminal 11.

Then, the terminal cover part 17 is provided with a regulating portion 19 for regulating the movement of the terminal cover part 17 in the closing direction by coming in contact with the upper surface 5 of the battery 3.

Further, the regulating portion 19 is provided on the lower surface of an extension portion 21 that is exposed from the recess 7 and extends over the upper surface 5 of the battery 3, and on the end of the extension portion 21, a operating portion 23 for opening and closing the terminal cover part 17 is provided.

As shown in FIGS. 1 to 5, the battery 3 is formed in a rectangular shape and is provided with the recess 7 formed on a corner of the upper surface 5 by cutting such that the level is one step lower than the upper surface 5. The battery post 9 is arranged to project in the recess 7. The battery post 9 is connected with the battery terminal 11.

The battery terminal 11 is made of a conductive material, and is provided with a battery connecting portion 25 having a hole into which the battery post 9 is inserted to be electrically connected thereto on one end side of the battery terminal 11, and a stud bolt 27 is arranged to project toward the upper surface 5 of the battery 3 at the other end side of the battery terminal 11.

The battery terminal 11 is fixed to the battery 3 by tightening a bolt 29 while the battery post 9 is inserted into the battery connecting portion 25. The stud bolt 27 of the battery terminal 11 fixed to the battery 3 is connected with a fuse element 31 of the fuse unit 13.

In the fuse unit 13, a fuse element 31 that is provided with a fuse to be blown out by an overcurrent and that is made of a conductive material is subjected to mold-forming by a synthetic resin. Further, the fuse unit 13 has a terminal part 33 arranged on the battery terminal 11 side and a fuse part 35 provided with a fuse, and the fuse part 35 side is bent toward the side surface of the battery 3 such that the fuse unit 13 is formed in an L-shape.

The terminal part 33 is arranged on the stud bolt 27 side of the battery terminal 11, and the stud bolt 27 of the battery terminal 11 is connected with the fuse element 31 of the terminal part 33, and thereby, the fuse unit 13 is electrically connected to the battery 3 via the battery terminal 11.

A connector provided on the end portion of the electric wires coupled to various devices and others mounted in the vehicle is connected to the fuse unit 13 described above. Due to this, the fuse unit 13 supplies electric power from the battery 3 to various types of devices. When an overcurrent is inputted to the fuse element 31, a fuse is blown out to cut off the supply of power between the battery 3 and the various devices.

The battery cover 1 is arranged to cover the outer periphery of the fuse unit 13. The fuse unit 13, the battery post 9, and the battery terminal 11 are protected by the battery cover 1.

The battery cover 1 is made of an insulating material such as a synthetic resin and has the fuse cover part 15 and the terminal cover part 17.

Figure 3:
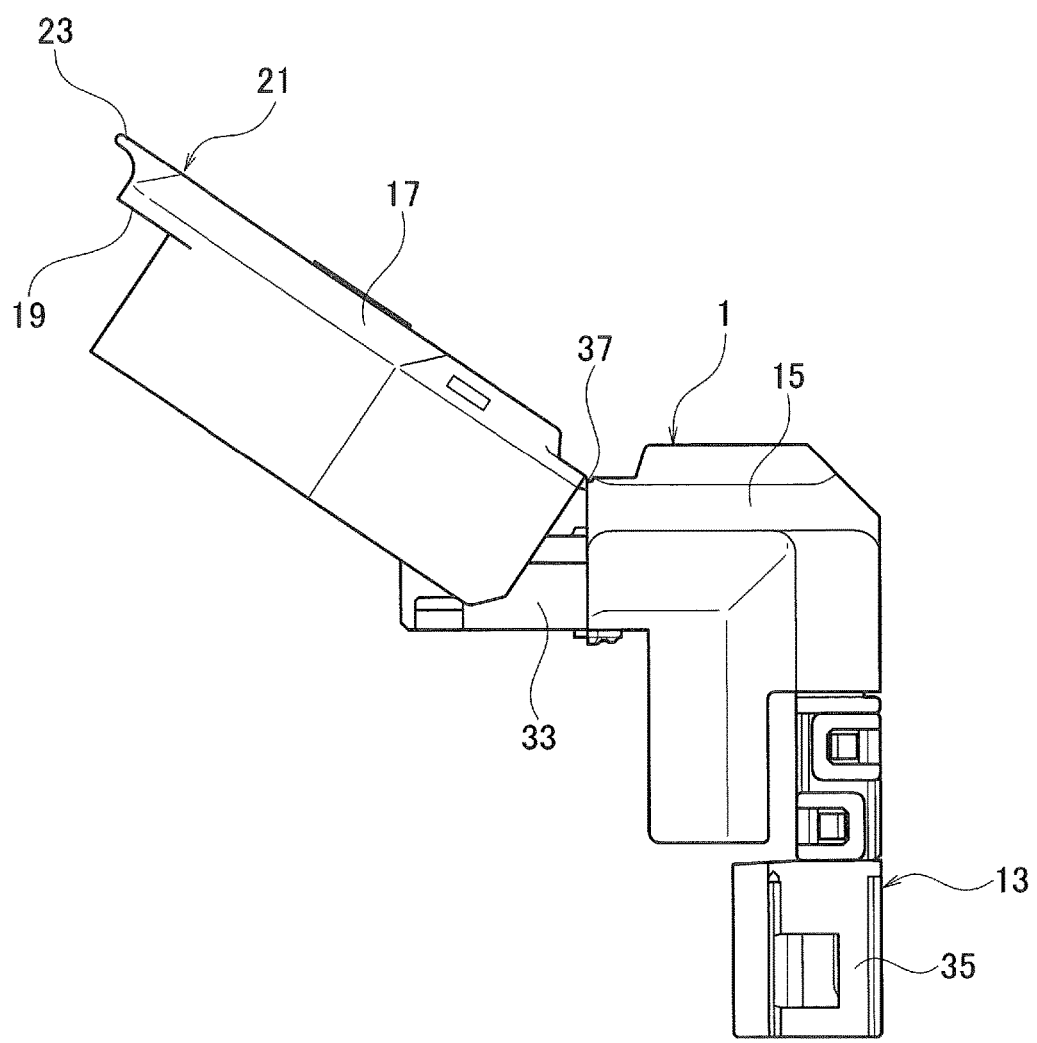
FIG. 3 is a side view that illustrates the terminal cover part of a battery cover according to an embodiment of the present invention when being opened and closed.
Figure 4:
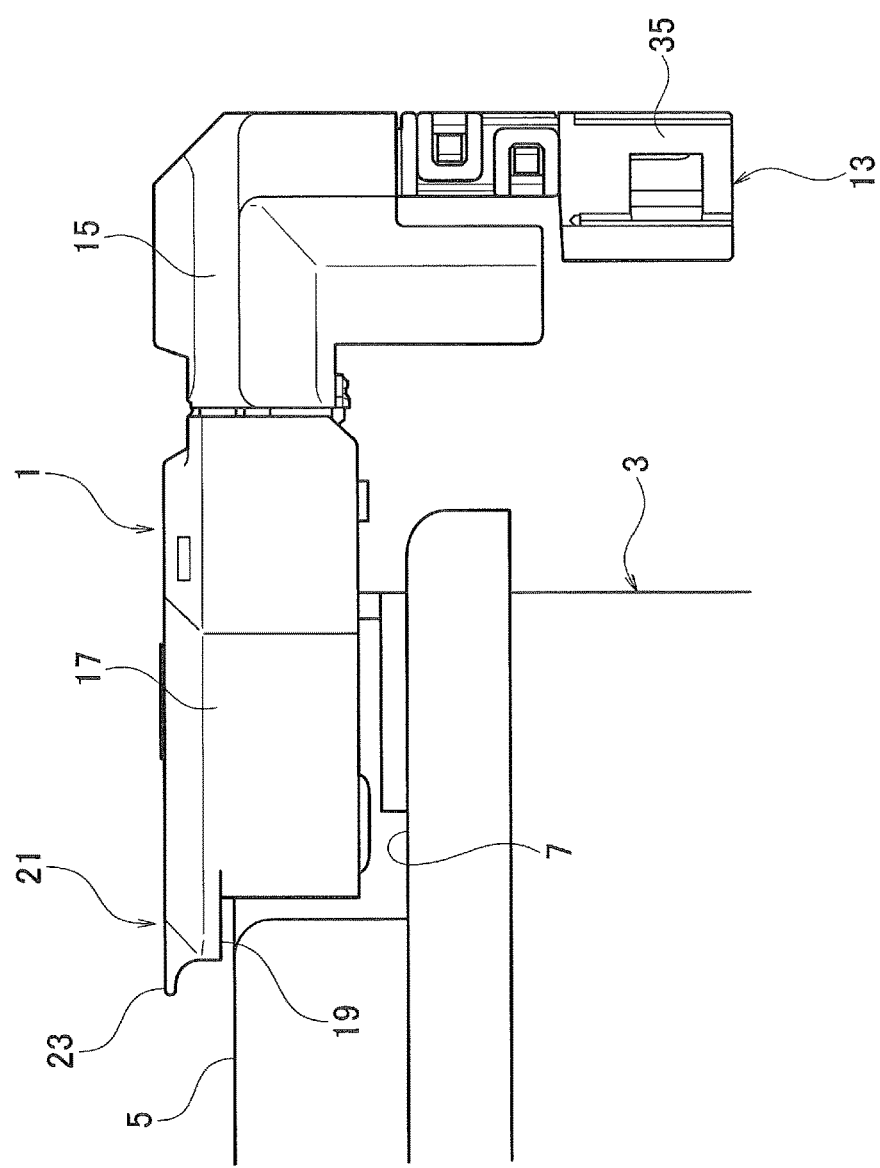
FIG. 4A is a side view that illustrate a battery cover according to an embodiment of the present invention, mounted on a battery.
FIG. 4B is an enlarged diagram of a main part in the FIG. 4A.
Figure 5:
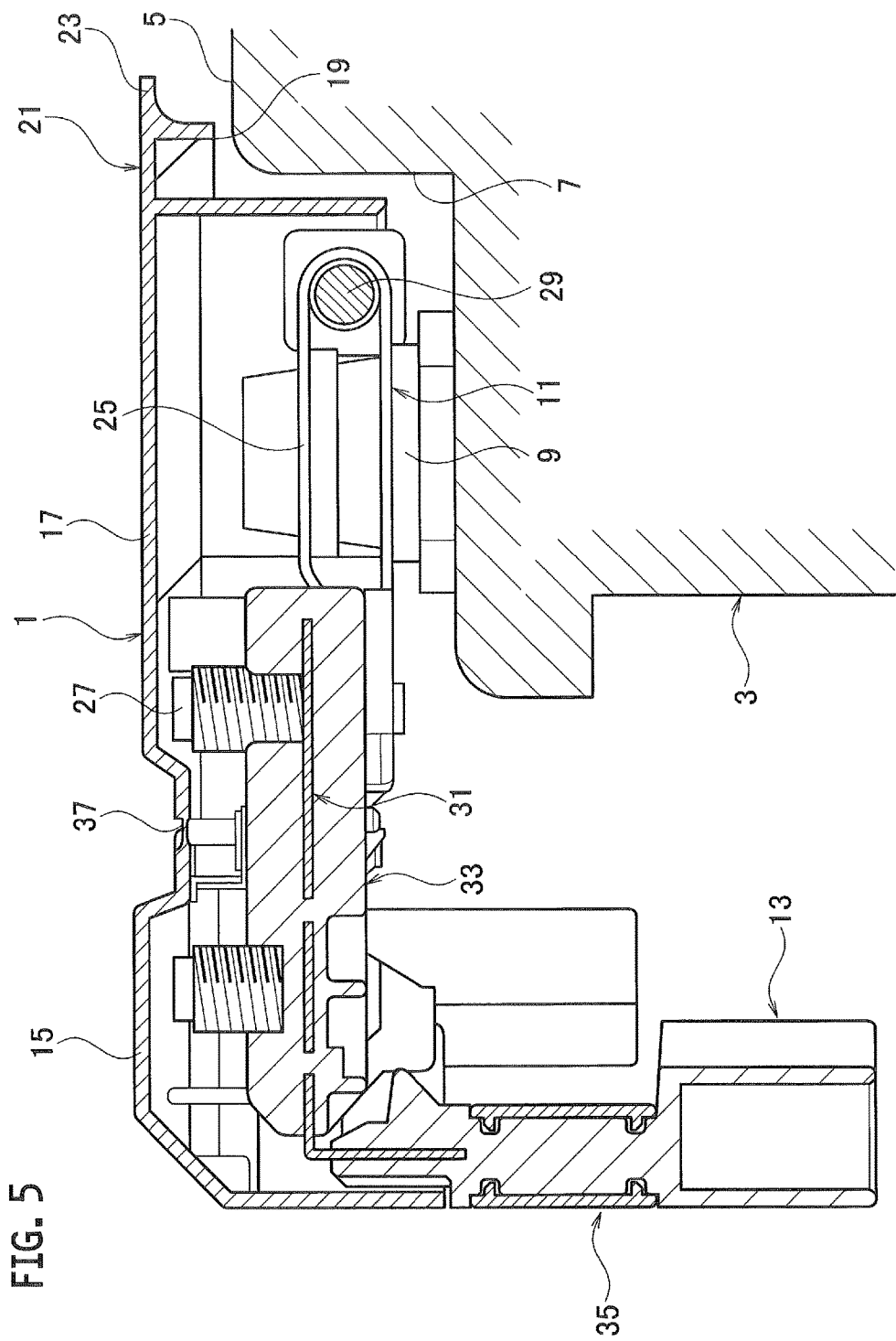
FIG. 5 is a cross-sectional view that illustrates a battery cover according to an embodiment of the present invention, mounted on a battery.

The fuse cover part 15 is arranged to cover mainly the upper side of the fuse part 35 of the fuse unit 13 and is fixed to the fuse unit 13 via engaging portions (not shown) provided on the fuse unit 13 and the fuse cover part 15 respectively. The terminal cover part 17 is coupled with the fuse cover part 15 so as to be capable of being opened and closed via a hinge portion 37 as shown in FIG. 3.

The terminal cover part 17 are arranged in the recess 7 of the battery 3 so as to cover mainly the battery post 9 of the battery 3 and the battery terminal 11, and by applying the engaging portions (not shown) respectively provided on the fuse cover part 15 and the terminal cover part 17, the closed state is maintained.

When the terminal cover part 17 covering the battery post 9 and the battery terminal 11 is excessively closed with respect to the recess 7 of the battery 3, a rear surface or an end of the terminal cover part 17 interferes with the battery post 9 and the battery terminal 11, and there is a possibility that the damage occurs on the battery post 9 or the battery terminal 11.

Therefore, the terminal cover part 17 is provided with a regulating portion 19 that regulates the movement of the terminal cover part 17 in the closing direction and prevents the terminal cover part 17 from being excessively closed.

The regulating portion 19 is a lower surface of the extension portion 21 extending from the end of the extension portion 21, exposed from the recess 7 of the terminal cover part 17, toward the upper surface 5 of the battery 3. When the terminal cover part 17 is closed toward the recess 7, the regulating portion 19 comes in contact with the upper surface 5 of the battery 3.

By the contact of the regulating portion 19 with the upper surface 5 of the battery 3, excessive movement of the terminal cover part 17 in the closing direction is regulated. This can prevent the rear surface or the end of the terminal cover part 17 from interfering with the battery post 9 or the battery terminal 11, resulting in prevention of damage occurring to the battery post 9 and the battery terminal 11.

Here, the operating portion 23 is provided on the end of the extension portion 21 of the terminal cover part 17, for opening and closing the terminal cover part 17. Further, under the extension portion 21 when the terminal cover part 17 is closed, a gap is positioned between the end of the terminal cover part 17 and the inner wall of the recess 7 of the battery 3.

For example, in the case where the operating portion 23 is provided on the end of the terminal cover part 17 without the extension portion 21 on the terminal cover part 17, the operating portion 23 will be positioned above the gap between the end of the terminal cover part 17 and the inner wall of the recess 7 of the battery 3, while the terminal cover part 17 is closed.

In such a case, when the terminal cover part 17 is opened or closed by manipulating the operating portion 23, there is a risk that a finger of the person who conducts the operation may enter the gap between the end of the terminal cover part 17 and the inner wall of the recess 7 of the battery 3 and then the finger may come in contact with the battery terminal 11 or the like.

Therefore, in the battery cover 1, by providing the operating portion 23 on the end of the extension portion 21 located above the gap between the end of the terminal cover part 17 and the inner wall of the recess 7 of the battery 3, a finger of the person who conducts the operation can be prevented from entering the gap between the end of the terminal cover part 17 and the inner wall of the recess 7 of the battery 3 at the time of manipulating the operating portion 23.

In such a battery cover 1, the regulating portion 19 for regulating the movement of the terminal cover part 17 in the closing direction by coming in contact with the upper surface 5 of the battery 3 is provided on the terminal cover part 17, and thus, when the terminal cover part 17 is closed, the terminal cover part 17 is not moved excessively in the closing direction, and the terminal cover part 17 does not interfere with the battery post 9 or the battery terminal 11.

Therefore, in such a battery cover 1, since the excessive movement of the terminal cover part 17 in the closing direction can be regulated by the regulating portion 19, damage to the battery post 9 or the battery terminal 11 can be prevented when the terminal cover part 17 is closed.

Further, the regulating portion 19 is provided on the lower surface of the extension portion 21 that is exposed from the recess 7 and extends over the upper surface 5 of the battery 3, and therefore, while preventing interference between the terminal cover part 17 and the battery post 9 or the battery terminal 11 when the terminal cover part 17 is closed, the gap between the side wall of the recess 7 and the terminal cover part 17 can be closed by the extension portion 21.

Further, since the operating portion 23 for opening and closing the terminal cover part 17 is provided on the end of the extension portion 21, when manipulating the operating portion 23, a finger of the person does not enter the gap between the side wall of the recess 7 and the terminal cover part 17, and the contact thereof with the battery post 9 or the battery terminal 11 can be prevented.

Incidentally, in the battery cover according to an embodiment of the present invention, the regulating portion is provided on the lower surface of the extension portion; however it is not limited to this, and for example, the regulating portion may be provided on the lower surface of the terminal cover part facing the bottom of the recess, and thus, as long as the regulating portion can regulate the movement of the terminal cover part in the closing direction by coming in contact with the upper surface of the battery, the position where the regulating portion is provided may be any position of the terminal cover part.

Although the embodiment of the present invention has been described heretofore, the embodiment is merely exemplified for facilitating the understanding of the present invention, and the present invention is not limited to the embodiment. The technical scope of the present invention may include not only the specific technical matters disclosed in the above-described embodiment but also various modifications, changes, and alternative techniques easily derived from the above-described specific technical matters.

What is claimed is:

1. A battery cover for covering an outer periphery of a fuse unit connected, through a battery terminal, to a battery post projecting in a recess formed on a top surface of a battery, the battery cover comprising:
   a fuse cover part covering the outer periphery of the fuse unit; and
   a terminal cover part connected to the fuse cover part to be capable of being opened and closed, arranged in the recess, and covering the battery post and the battery terminal, wherein
   the terminal cover part is provided with a regulating portion configured to regulate a movement of the terminal cover part in a closing direction by coming in contact with the top surface of the battery,
   wherein the terminal cover part includes an extension portion exposed from the recess and extending over the top surface of the battery when the terminal cover part is in a closed position, and
   the regulating portion is provided on a lower surface of the extension portion in the closed position.

2. The battery cover according to claim 1, wherein
   an operating portion for opening and closing the terminal cover part is provided on an end of the extension portion.

3. The battery cover according to claim 2, wherein
   the regulating portion is provided on the lower surface of the extension portion exposed from the recess and extending over the top surface of the battery such that when the terminal cover part is closed, a gap positioned between an end of the terminal cover part and an inner wall of the recess is covered by the extension portion.

4. The battery cover according to claim 1, wherein
   the recess is provided on a corner of the top surface of the battery such that a level of a bottom surface of the recess is lower than the top surface, and
   the battery post is arranged so as to project in the recess.

5. The battery cover according to claim 1, wherein the regulating portion contacts the top surface of the battery to regulate the movement of the terminal cover part in the closing direction to prevent the terminal cover part from interfering with the battery post or the battery terminal.

6. The battery cover according to claim 1, wherein the terminal cover part is closed toward the recess and the regulating portion is in contact with the top surface of the battery.

7. The battery cover according to claim 1, wherein
   the regulating portion is provided on a lower surface of the terminal cover part facing a bottom of the recess to regulate the movement of the terminal cover part in the closing direction by coming in contact with the top surface of the battery.

* * * * *